Aug. 18, 1936.  F. B. S. GRIMSTON  2,051,140
HOOD FOR VEHICLES
Filed Nov. 6, 1935   3 Sheets-Sheet 1

Inventor,
Francis B. S. Grimston,
By Cushman Darby & Cushman
Attorneys

Inventor:
Francis B. S. Grimston

Aug. 18, 1936.  F. B. S. GRIMSTON  2,051,140
HOOD FOR VEHICLES
Filed Nov. 6, 1935  3 Sheets-Sheet 3

Inventor
Francis B. S. Grimston
By Lukeman, Darby & Cushman
Attorneys

Patented Aug. 18, 1936

2,051,140

UNITED STATES PATENT OFFICE 2,051,140

HOOD FOR VEHICLES

Francis Brian Sylvester Grimston, Haslemere, Surrey, England

Application November 6, 1935, Serial No. 48,559
In Great Britain September 3, 1934

2 Claims. (Cl. 296—107)

This invention relates to improvements in hoods for vehicles and more particularly to automobile hoods of the kind which are moved from an "up" position over the tonneau to a "down" position and vice versa without being folded, the hood when not in use lying on the rear end of the car.

The principal object of the invention is to provide a hood of this kind and a mounting therefor, such that the hood can be manipulated with ease, the hood being controlled and guided in its movements so that the front end thereof is always maintained above and clear of the heads of the occupants of the vehicle, as the hood is moved from the "up" to the "down" position and vice versa, and the view of the occupants of the car and the entry and egress from the car remain unobstructed.

In accordance with the present invention therefore, there is provided a hood for vehicles adapted to be moved substantially without deformation from an "up" position over the tonneau of the vehicle into a "down" position over the rear end of the vehicle body, in which the position of the hood during movement from one end position to the other is positively controlled by the co-operation of stationary guides with which the rear end of the hood is coupled and movable struts pivoted to the vehicle body and to the hood, and adapted to support the front end of the hood. The improved arrangement is such that in the "up" position of the hood the side links or struts may lie at least for the main part to the rear of the edges of the side flanges of the hood.

In the preferred arrangement the side links or struts also lie wholly or for the main part beyond the edges of the side flanges of the hood when the latter is in its "down" position over the rear end of the vehicle body.

The side links may be mounted in such a manner as to be constrained to move together about the pivots on the hood and body during movements of the hood so that the latter is caused to move parallel to itself.

The invention is illustrated by way of example in the accompanying drawings in which—

Figure 1:
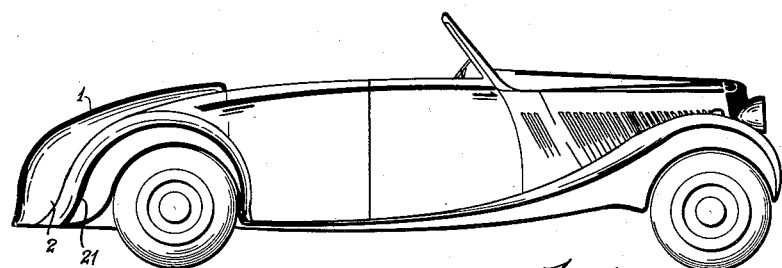
Figure 2:
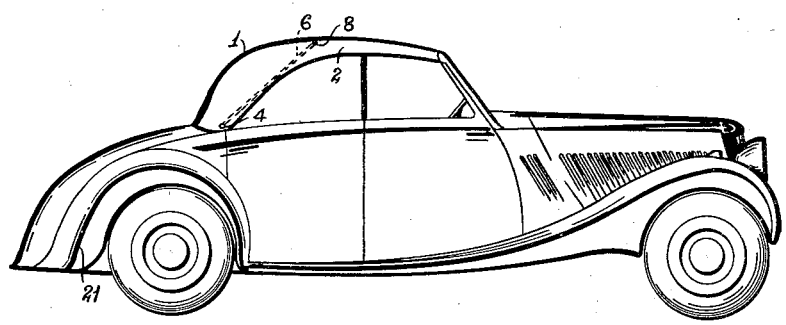
Figure 3:
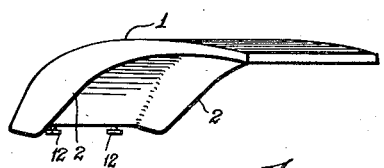
Figure 4:
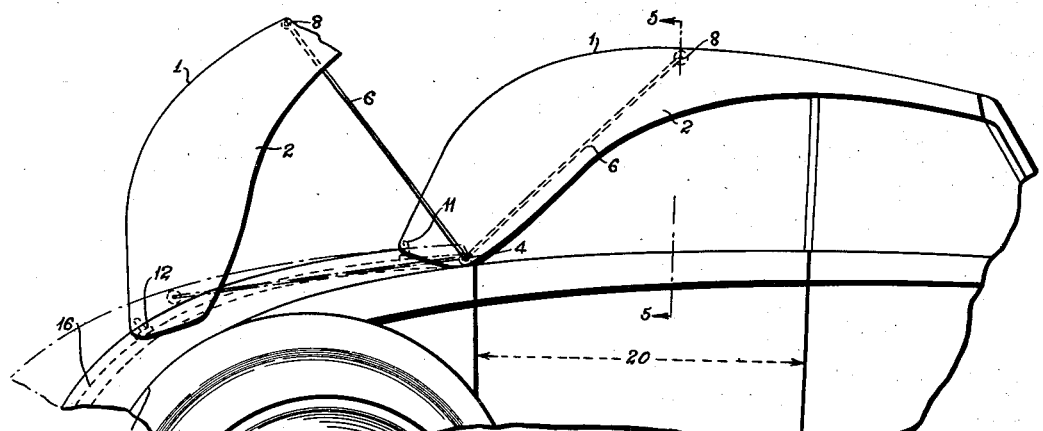
Figure 5:
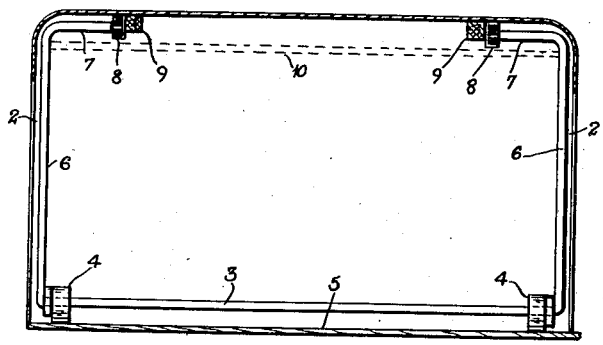
Figure 6:
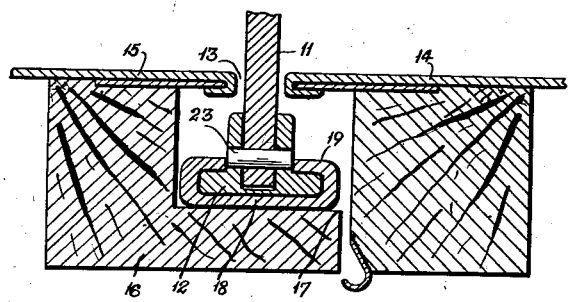
Figure 8:
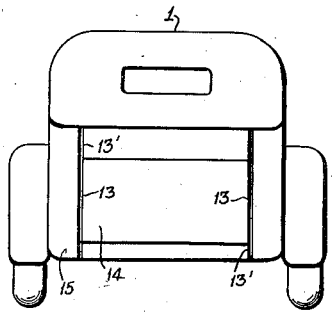
Figure 9:
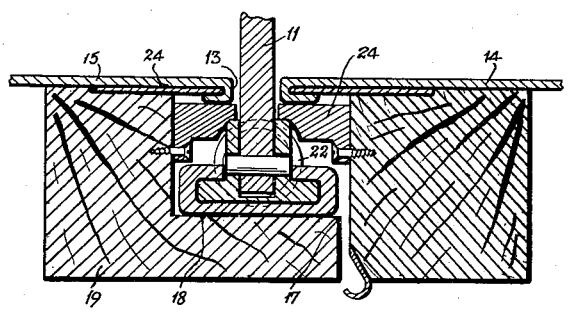
Figure 7:
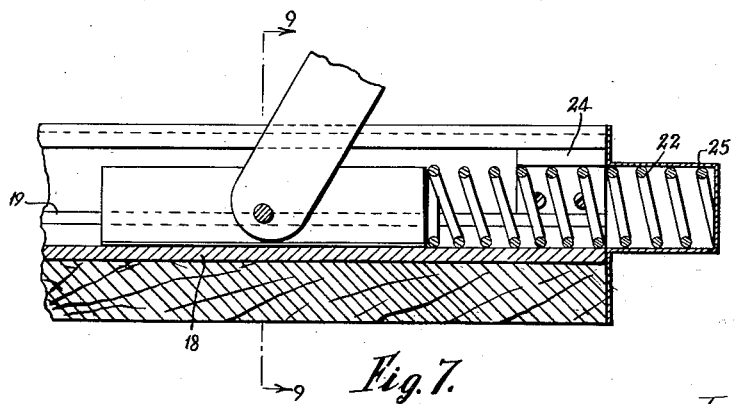

Figs. 1 and 2 are views in side elevation of a vehicle provided with a hood and mounting in accordance with the invention, the hood being shown lowered in Fig. 1 and raised in Fig. 2, Fig. 3 is a pictorial view of the hood alone, Fig. 4 is a view on a larger scale of a part of the vehicle and showing the hood and links in alternative positions, Fig. 5 is a sectional view on the line 5—5 of Fig. 4, Fig. 6 is a sectional view of one side of the rear end of the vehicle body and of the means employed to guide the rear end of the hood, Fig. 7 is a view in side elevation of the guiding means for the rear end of the hood and of the upper end of a guide, Fig. 8 is a rear elevation of the vehicle with the hood in the raised position, Fig. 9 is a sectional view on the line 9—9 of Fig. 7.

Referring to the drawings, the hood 1 may be formed of sheet metal shaped as shown in Fig. 3, being of approximately quarter elliptic shape in side view and provided with depending side flanges 2. In the case illustrated the flanges are of increasing width towards the lower or rear end of the hood, but it is to be understood that other shapes may be employed and the width of said flanges may be varied within the ordinary limits imposed by considerations of appearance of the vehicle and the amount of window or observation space which it is necessary to provide to afford a satisfactory field of view to occupants of the vehicle beneath the hood.

At each side of the vehicle is provided a link pivotally connected with the vehicle body and with the hood 1.

In the case illustrated, a length of metal tubing or rod is bent to approximately U-form (Fig. 5) and the cross piece 3 thereof is mounted in plummer blocks 4 carried on a cross member 5 provided on the vehicle body to the rear of the squab.

The limbs 6 of the U, form the links and they are bent at their upper ends as shown at 7 and the extremities of parts 7 mounted in self aligning bearings 8 carried by brackets 9 secured to the underside of the hood 1. The integral cross piece 3 ensures that the links 6 shall at all times move together.

In some cases a further connecting member such as a bar 10 shown in dotted lines in Fig. 5, may be provided between the ends of the links 6 adjacent the pivots 8.

The rear end of the vehicle body is curved downwardly towards the rear, the shape approximating to that of the hood, and means are provided on the hood for co-operation with means on the vehicle body for guiding the rear end of the hood.

For this purpose, at the rear edge of the hood 1 are fixedly mounted a pair of brackets 11 to the lower ends of which are connected T-shaped sliders 12, the connection being through horizontal pivot pins 23 so that the sliders may rock about the pins with regard to the brackets 11.

The brackets 11 and sliders 12 are arranged near the opposite sides of the hood, Fig. 3, and project downwards through slots 13, one of which is shown in Fig. 6 formed between the side edges of the cover 14 of the boot or storage space within the rear end of the vehicle, and the side portions 15 of said rear end. As will be seen from Fig. 8 the slots 13 in the rear end of the vehicle extend between points at or near the upper and lower extremities of the rear end so that extensions 13' thereof are formed above and below the upper and lower edges of the cover 14. A frame member 16 of each of said side portions 15 is rebated as shown at 17 and in the rebate is fixed a channel section guide member 18 the edges 19 of which are inturned. The sliders 12 engage and slide within the channel section members 18.

In the preferred arrangement buffer springs 22 are provided at the upper ends of guide members 18, the ends of these springs being supported in housings 25 at the forward end of the rear of the vehicle, while metal or other rigid blocks 24 are provided within the space formed by the rebate 17 to locate said springs 22 while permitting movement to the free ends thereof.

In the up position of the hood 1 as shown in Figs. 2 and 4, the links 6 project upwardly and forwardly and in the case illustrated the front end of the hood engages the windscreen and is supported thereon, the sliders 12 engaging the springs 22 in such a manner as to compress them so that the parts are held against rattling. If desired however, the links 6 and the sliders 12 alone may support the hood.

The points of connection 8 of the links or struts 6 with the hood lie forwardly of the points of connection 4 of the struts with the vehicle body, in the "up" position of the hood, and as a consequence the front end of the hood will be raised on the struts well above the heads of the occupants of the vehicle as the hood is moved from the "up" to the "down" position or vice versa (see Fig. 4). In the raised position of the hood the links 6 lie to the rear of the forward edges of the flanges 2 as clearly shown in Fig. 4, so that they offer no obstruction to the view of the occupants across the space between the flanges 2 and the top of the side wall of the vehicle body. Furthermore, the full width of a door space 20 may be left clear or side curtains or screens may easily be fitted to cover the space between the hood flanges and the edge of the body without regard to the existence of the links 6.

In the arrangement shown the upper axis of pivotation on the hood is situated approximately midway between the front and rear ends of the hood 1, and the lower axis on the body is situated adjacent the lower front corners of the side flanges 2, the hood being considered as in the raised position; and it will be seen from Fig. 4 that the links 6 when the hood is lowered lie above the edges of the flanges 2 and are in this case concealed.

The links 6 may however, be arranged on the outside of the hood flanges instead of inside as shown. In this case the lower axis of pivotation would be slightly below the lower rear ends of the flanges 2, the hood again being considered as in the up position, but the links 6 in the up position would still lie almost wholly to the rear of, though outside the edges of the flanges 2.

Instead of connecting the opposite links together, as by cross pieces 3 or 10, links of very stiff material mounted in robust aligned bearings on the hood may be used, the rigidity of the hood itself in conjunction with the guide means 12, 18 being relied upon to constrain the links to move together and the hood to move parallel to itself.

Seatings 21 may be formed at each side of the rear end of the vehicle on which the hood flanges 2 rest when the hood is down and the links 6 may lie at each side of the rear end or alternatively grooves or other convenient housing spaces may be provided to receive the links. As the lowering movement of the hood is commenced the springs 22 urge the sliders rearwardly in the guides 18 and thus avoid any tendency on the part of said sliders to bind in the guides.

The links 6 at their lower ends may be pivotally mounted either inside or outside the body of the vehicle or between inner and outer panels or walls.

I claim:

1. In a vehicle body having a downwardly curved rear portion provided with spaced guides, said guides extending longitudinally of the length of the body, a combined slidably and pivotally mounted hood for covering the tonneau of the vehicle, said hood having side flanges, means slidably connecting the rear end of said hood to said guides, spaced members pivotally connected to the hood, and means pivotally connecting said members about a fixed fulcrum to the vehicle body and hood whereby the hood and said members are arranged to be swung about the fixed fulcrum and the hood is guided in its movement to its extreme positions by said guides, said members lying within the edges of the side flanges when the hood is in either of its extreme positions.

2. In a vehicle body having a downwardly curved rear portion provided with spaced guide slots extending longitudinally of the length of the body, said slots having buffer springs mounted in the upper ends thereof, sliders movable in said slots, a combined slidably and pivotally mounted hood for covering the tonneau of the vehicle body, said hood adapted to be moved from an "up" position over the tonneau into a "down" position over said rear portion, means connecting the sliders to the rear end of said hood, said sliders arranged to engage the buffer springs when the hood is in its "up" position, spaced members pivotally connected to the hood, means pivotally connecting said members about a fixed fulcrum to the vehicle body and hood, whereby the hood and said members are arranged to be swung about the fixed fulcrum and the hood is guided in its movement to its extreme positions by said sliders, said buffer springs upon the initial movement of the hood to its "down" position acting to prevent the sliders from binding in said slots.

FRANCIS BRIAN SYLVESTER GRIMSTON.